May 26, 1925.  H. McALEISH  1,539,262
INSTRUMENT
Filed May 26, 1924
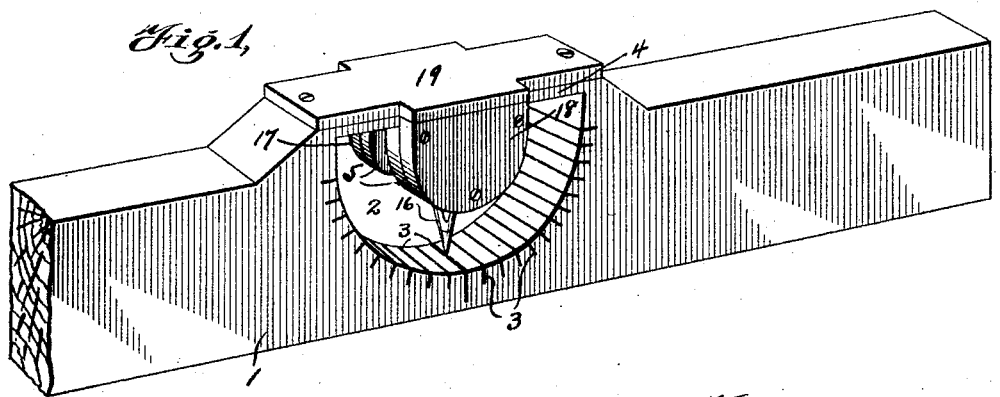
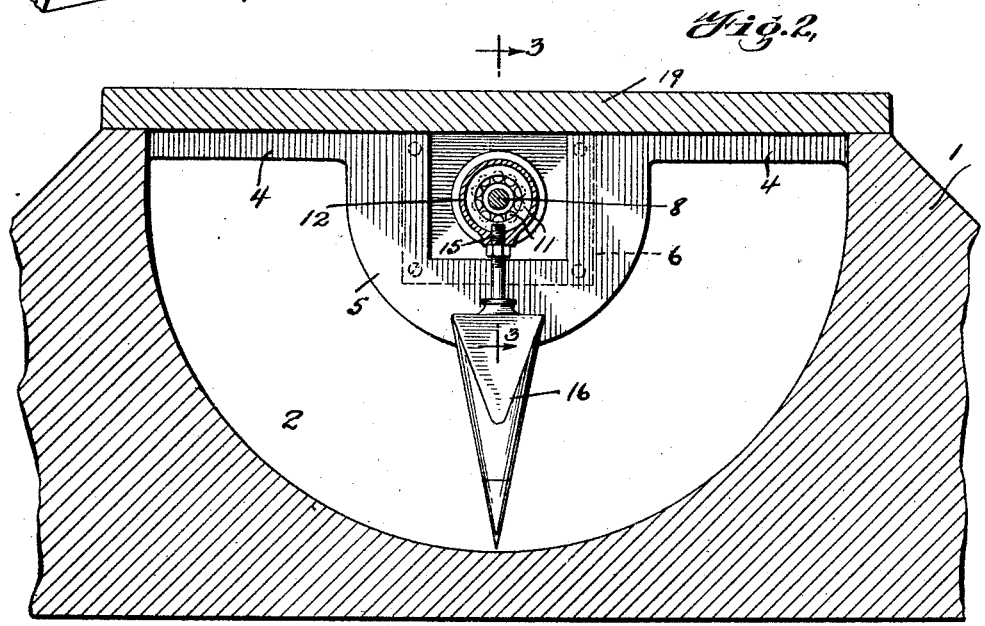
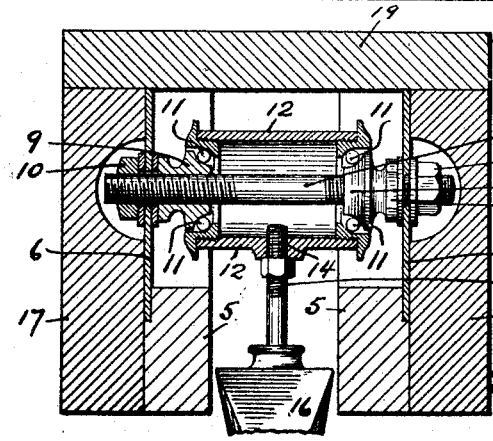
Inventor
Hugh McAleish
By his Attorneys Patented May 26, 1925.

1,539,262

UNITED STATES PATENT OFFICE.

HUGH McALEISH, OF NEW YORK, N. Y.

INSTRUMENT.

Application filed May 26, 1924. Serial No. 715,782.

*To all whom it may concern:*

Be it known that I, HUGH McALEISH, a citizen of the United States, and a resident of New York city, in the county of Bronx and State of New York, have invented a certain new and useful Improvement in Instruments, of which the following is a specification.

My invention relates to an improved instrument capable of use by carpenters, plumbers and other trades, and an object thereof is the provision of a novel and practical instrument capable of universal use both as a gage for determining the inclination of structures and as a level.

A further object of the invention is the provision of an instrument of the character described which is much simpler in construction and less expensive to manufacture than such instruments as now constructed and marketed.

A still further object of the invention is the provision of an instrument such as above outlined which has no delicate or complicated parts which are likely to get out of order or to be broken by rough usage or by dropping the instrument.

Another object of the invention is the provision of a combined leveling instrument and inclination gage in which an indicator is employed which while supported in antifriction bearings is so simple in construction and so simply mounted as to practically eliminate any danger of the same getting out of order when roughly handled. This indicator is of such a character that the same will always swing by gravity to a vertical position to accurately indicate the inclination of the structure being gaged or measured by the instrument.

A still further object of the invention is the provision of an instrument of the character above indicated which can be read when held in almost any position, the device being so arranged that the operator is not obliged to stand immediately in front of it in order that he may read it.

Other objects of my invention will be manifest from the following description and from the accompanying drawing, in which—

Fig. 1 is a perspective view of a level constructed in accordance with my invention;

Fig. 2 is an enlarged sectional view of the operating parts of my level; and

Fig. 3 is a section on the line 3—3 of Fig. 2.

Referring to the drawing in detail, 1 designates the stock or bar of a level provided with an opening curved longitudinally and extending through the stock transversely thereof. Graduations 3 are provided on the wall of the opening and the sides of the stock adjacent the opening.

Across the top of the opening 2 I provide a bridge 4, carrying side flanges 5, one at each side of the bridge. Secured to these flanges are side or bearing plates 6 and 7. The plates 6 and 7 support a transversely extending stationary shaft 8. Each end of this shaft is provided with a bearing hub 9 screw-threaded on the shaft. The shaft is held in place by nuts 10, one on each end of the shaft, the side plates 6 and 7 being clamped between these nuts and the bearing hubs. Supported on ball bearings 11 carried in runways provided in the bearing hubs 9 is a barrel 12. The friction between the barrel and its bearings may be varied as desired by adjusting the bearing hubs 9, which are provided with flattened portions 13 for that purpose.

In the periphery of said barrel I provide a threaded opening 14 extending transversely of the barrel and adapted to receive a screw 15, which carries an indicator 16, this indicator being in the form of a plumb bob, the lowermost extremity of which functions as a pointer, which co-operates with the graduations 3. This indicator extends down below the lower edges of the side plates 6 and 7, so as to be visible at all times, regardless of the position in which the instrument is held, and inasmuch as this indicator is secured to the barrel 12 and is heavy, it will be obvious that the same will always assume an upright or vertical position so as to always correctly indicate the inclination of the instrument. It will be obvious also that side motion or play of the indicator is eliminated, due to the manner in which it is suspended or supported, thereby further insuring accuracy of the instrument.

If desired, side plates 17 and 18 may be provided as shown and secured to the side plates or flanges 5 to conceal or cover the ends of the shaft 8 and the nuts thereon. A cover plate 19 may also be employed, if desired.

It is to be understood that changes may be made in the details of the construction above described within the spirit and scope of my invention.

What I claim is:

In an instrument of the class described the combination of a stock, provided with a transverse opening extending therethrough, a bridge across the top of said opening and extending longitudinally of the stock, side flanges secured to said bridge, side plates secured to said flanges, a shaft supported in said plates, bearing hubs carried by said shaft, nuts on the ends of said shaft for clamping the side plates between the bearing hub and the nuts to hold the shaft and bearing hubs against rotation, ball bearings in said hubs, a barrel supported on said bearings, and an indicator adjustably attached to the periphery of said barrel and extending transversely of the barrel, said indicator and barrel being adapted to swing by gravity to vertical position at all times.

This specification signed this 23rd day of May 1924.

HUGH McALEISH.